US012648069B2

(12) United States Patent
Cantudo Franco et al.

(10) Patent No.: US 12,648,069 B2
(45) Date of Patent: Jun. 2, 2026

(54) ELECTRONIC ASSEMBLY AND AUTOMOTIVE LUMINOUS DEVICE

(71) Applicant: VALEO VISION, Bobigny (FR)

(72) Inventors: Miguel Angel Cantudo Franco, Martos (ES); Jesus Jurado, Martos (ES); Alberto Gonzalez Rico, Martos (ES)

(73) Assignee: Valeo Vision, Bobigny (FR)

( * ) Notice: Subject to any disclaimer, the term of this patent is extended or adjusted under 35 U.S.C. 154(b) by 22 days.

(21) Appl. No.: 18/722,275

(22) PCT Filed: Dec. 23, 2022

(86) PCT No.: PCT/EP2022/087722
§ 371 (c)(1),
(2) Date: Jun. 20, 2024

(87) PCT Pub. No.: WO2023/118564
PCT Pub. Date: Jun. 29, 2023

(65) Prior Publication Data
US 2025/0048522 A1 Feb. 6, 2025

(30) Foreign Application Priority Data
Dec. 26, 2021 (EP) .................................... 21217762

(51) Int. Cl.
*H05B 47/17* (2020.01)
*H05B 45/52* (2020.01)
(Continued)

(52) U.S. Cl.
CPC ............. *H05B 47/17* (2020.01); *H05B 45/52* (2020.01); *H05B 45/54* (2020.01); *H05B 47/155* (2020.01)

(58) Field of Classification Search
CPC ........ H05B 45/30; H05B 45/50; H05B 45/52; H05B 45/54; H05B 45/60; H05B 47/155;
(Continued)

(56) References Cited

U.S. PATENT DOCUMENTS 6,798,152 B2 9/2004 Rooke et al.
9,821,705 B2 11/2017 Levasseur
(Continued)

FOREIGN PATENT DOCUMENTS

EP 3599795 A1 * 1/2020 ............ H05B 45/46
EP 3629676 A1 1/2020
(Continued)

OTHER PUBLICATIONS

Japan Patent Office, Office Action (with English translation) of corresponding Japanese Patent Application No. 2024-537156, dated Apr. 18, 2025, 10 pages.
(Continued)

*Primary Examiner* — Thai Pham
(74) *Attorney, Agent, or Firm* — Valeo Vision

(57) ABSTRACT

The invention provides an electronic assembly for an automotive luminous device. The electronic assembly includes a first group of light sources, a second group of light sources, a driver element to control the operation of the light sources and a mode selection circuit. The mode selection circuit is configured to receive a mode selection control signal and to provide an output signal with a control value which depends on the mode selection control signal. The driver element includes a first input configured to receive power supply, a second input configured to receive the output signal of the mode selection circuit and an output received by the first group of light sources and by the second group of light sources, so that the operation of the first group of light
(Continued)

sources and of the second group of light sources is controlled by the output of the driver element.

13 Claims, 4 Drawing Sheets

(51) Int. Cl.
*H05B 45/54* (2020.01)
*H05B 47/155* (2020.01)

(58) Field of Classification Search
CPC ........ H05B 47/17; B60Q 1/20; B60Q 1/2607; B60Q 1/04; B60Q 1/303
See application file for complete search history.

(56) References Cited

U.S. PATENT DOCUMENTS

| | | | | |
|---|---|---|---|---|
| 10,701,772 | B2 * | 6/2020 | Schmidt .................... | F21V 5/02 |
| 11,229,098 | B2 | 1/2022 | Kanbara | |
| 11,425,807 | B2 | 8/2022 | Chen et al. | |
| 2011/0080753 | A1 * | 4/2011 | Hering .................. | F21S 41/153 362/545 |
| 2016/0318439 | A1 * | 11/2016 | Levasseur .............. | H05B 45/14 |

FOREIGN PATENT DOCUMENTS

| | | | |
|---|---|---|---|
| JP | 2005072187 | A | 3/2005 |
| JP | 2005536849 | A | 12/2005 |
| JP | 2011111442 | A | 6/2011 |
| JP | 2011216663 | A | 10/2011 |
| JP | 2012028184 | A | 2/2012 |
| JP | 2020064836 | A | 4/2020 |
| JP | 2021028890 | A | 2/2021 |
| JP | 2021527932 | A | 10/2021 |

OTHER PUBLICATIONS

Japan Patent Office, Search Report (with English translation) of corresponding Japanese Patent Application No. 2024-537156, dated Apr. 23, 2025, 523 pages.
European Patent Office, International Search Report and Written Opinion of corresponding International Application No. PCT/EP2022/087722, dated Jun. 5, 2023.

* cited by examiner

ELECTRONIC ASSEMBLY AND AUTOMOTIVE LUMINOUS DEVICE

TECHNICAL FIELD

This invention belongs to the field of electronic assemblies comprised within the automotive luminous devices, intended to provide luminous functions to the vehicles.

BACKGROUND OF THE INVENTION

Automotive lighting market can be considered one of the most competitive ones and new lighting functionalities are constantly required. Some customer trends include multi-function luminous devices, where some of the lighting functions are designed to not be used at the same time.

This concept needs to be implemented by a driver element. Known solutions confer this driver element with the management of two simultaneous inputs for these functionalities, which leads to excessive complexity and costs.

The present invention provides an alternative arrangement to provide a controlled lighting function in an electronic assembly for an automotive luminous device of which at least two luminous functions are controlled in a mutually exclusive way, where one function cannot be activated at the same time as another one.

DESCRIPTION OF THE INVENTION

The invention provides an alternative solution for managing the current needs of the light sources of an automotive luminous device by an electronic assembly for an automotive luminous device, the electronic assembly comprising

- a first group of light sources, intended to contribute to a first luminous function,
- a second group of light sources, intended to perform a second luminous function,
- a driver element configured to control the operation of the first group of light sources and of the second group of light sources,
- a mode selection circuit, configured to receive a mode selection control signal and to provide an output signal with a control value which depends on the mode selection control signal, wherein the mode selection control signal comprises at least one of a first control signal and a second control signal,
- wherein the driver element comprises
- a first input configured to receive power supply,
- a second input configured to receive the output signal of the mode selection circuit, and
- an output which is received by the first group of light sources and by the second group of light sources, so that the operation of the first group of light sources and of the second group of light sources is controlled by the output of the driver element,
- wherein the first group of light sources comprises a switch controlled by the first control signal and the second group of light sources comprises a switch controlled by the second control signal.

With such an arrangement, a single driver may be used to control the operation of two different luminous functions, such as rear fog lamp-reverse lamp, direction indicator lamp-rear position lamp, stop lamp-rear position lamp, etc. In fact, the pair of rear fog lamp and reverse lamp is a typical example of mutually exclusive functions.

The power signal of the two different functionalities is fed to the driver, and a mode selection control signal, which derives from one of the power signals, is fed to the mode selection circuit, which comprises electronic components which uses the input of the mode selection control signal to provide a different impedance value. The mode selection control signal comprises at least one control signal, which is derived from the first or the second power signals. In some cases, the mode selection control signal comprises only one control signal, which is derived from the first power signal or from the second power signal. In these cases, if the mode selection control signal is active (this means that the power signal which produces the mode selection control signal is active and the other power signal is not active, since the two power signals cannot be active at the same time), the impedance of the mode selection circuit will be one which is suitable for the driver to feed the light group which corresponds to the power signal which produces the mode selection control signal. If the active power signal is the one which does not produce the mode selection control signal, the mode selection control signal will be zero, and the impedance of the mode selection circuit will be one which is suitable for the driver to feed the other light group.

In different cases, where the mode selection control signal comprises two control signals, each one being produced by one of the power signals, the mode selection circuit receives two control signals, but may only receive one at the same time because, since each control signal is produced by one power signal, and the two power signals cannot be received at the same time, only one of the control signals which be received by the mode selection circuit. If the received signal is the first control signal, the impedance of the mode selection circuit will be one which is suitable for the driver to feed the first light group, and if the received signal is the second control signal, the impedance of the mode selection circuit will be one which is suitable for the driver to feed the second light group.

In any case, a suitable output value is produced by the mode selection circuit, and this output value is fed to the second input of the driver.

This output value is received and used by the driver to provide the suitable current value for the active function. This current value is fed to both the first and the second light groups but, since each light group also have their own control, due to the fact that each light group receives its corresponding control signal which activates or deactivates the corresponding light group, only the activated light group receives in fact the current value from the light driver.

In some particular embodiments, the electronic assembly further comprises an input protection circuit which

- is configured to receive a first power signal and a second power signal;
- comprises a first protection output connected to the first input of the driver element, so that the input protection circuit controls the power received by the first input of the driver element as a function of the first power signal and the second power signal; and
- comprises a second protection output which receives one of the first and second power signals and provides the mode selection signal.

Since this element receives the power signals, the input protection element provides a power supply to the driver whenever any of them are active.

In some particular embodiments, the input protection circuit comprises a first circuit element receiving the first power signal and a second circuit element receiving the second power signal, wherein the output of the first circuit element and the output of the second circuit element are electrically connected to the first protection output of the input protection circuit.

The fact that the outputs of the circuit elements are connected is used to be consistent with the two input signals corresponding to non-simultaneous lighting functions.

In some particular embodiments, the input protection circuit comprises

- a first diode arranged at the output of the first circuit element, the first diode being directly connected to the first protection output;
- a second diode arranged at the output of the second circuit element, the second diode being directly connected to the first protection output; and
- a third circuit element arranged between one of the first and second power signals and the second protection output, the third circuit element comprising a third diode.

This arrangement of the first and second circuit elements, with their corresponding diodes, is equivalent to the use of an OR logical door, which is a simple and reliable structure which achieves the goal of this element. In fact, in alternative embodiments, a real OR logical door may be used. The third circuit element is used from one of the power signals to provide the mode selection control signal to the mode selection circuit. Since the mode selection control signal has a much lower consumption than the driver-light source group, the signal derived to the third circuit is much lower than the power signal output by the first protection output.

In some particular embodiments, the mode selection circuit comprises a first resistor group, a second resistor group and at least one switch element, in such a way that the mode selection control signal is arranged to act on the switch element opening or closing electric supply to the second resistor group, thus modifying the output signal value.

Just by having some groups of resistors and a simple switch, the mode selection circuit may use the information provided by the control signals to send a particular output to the driver, so that the driver may select the correct current to feed the active function.

In some particular embodiments, at least one of the first and the second resistor groups comprises a BIN resistor and a thermal resistor.

In some particular embodiments, the mode selection control signal only comprises the second control signal and the mode selection circuit only comprises one switch element, so that the impedance of the mode selection circuit when the control signal other than the mode selection signal is activated and when is not activated is the same.

A single mode selection signal is enough to manage the operation of the two resistor groups: if the mode selection signal is received, the switched is activated (or deactivated) and one of the resistor groups are incorporated into the circuit, so that the impedance when this mode selection signal is not activated is different from the case when this mode selection signal is activated. As a consequence, the other selection signal (the one which is not the mode selection signal) does not affect to the behavior of this impedance, since, in these embodiments, its signal is not received in the mode selection circuit.

In other particular embodiments, the mode selection circuit receives the two control signals and comprises two switches. In these cases, the first resistor group is controlled by a first switch and its activation by the first control signal causes the impedance to be the one needed by the first group of light sources and the second resistor group is controlled by a second switch and its activation by the second control signal causes the impedance to be the one needed by the second group of light sources.

In some particular embodiments, the impedance of the mode selection circuit when the mode selection signal is activated causes the output of the driver element to have a current value which is higher than the current value when the mode selection signal is not activated.

In these embodiments, the default current value is the lowest value of the two functionalities to be controlled. Thus, the system is protected against an accidental fault, which could set the current value to a high value. A high value may damage the light sources intended to perform one of the luminous functions, which may not adapted to such a high values.

In some particular embodiments, the driver is configured to provide a higher current value in the output when the current value received in the second input is higher.

This way of managing the driver operation is valid for many existing drivers.

In some particular embodiments, the switch element is a transistor, such as a BJT or a MOSFET.

In some particular embodiments, the first group of light sources and the second group of light sources are arranged in parallel. In other embodiments, the first group of light sources and the second group of light sources are arranged in series.

In some particular embodiments, the light sources are solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In a second inventive aspect, the invention provides an automotive luminous device comprising

- an electronic assembly according to the first inventive aspect, wherein the first luminous function is the rear fog lamp and the second luminous function is the reversing lamp; and
- an optical element arranged to project the light emitted by the first group and the second group of light sources.

The rear fog lamp and the reversing lamp are usually mutually exclusive, so that the body control module does not send both activation control signals at the same time to the lighting device. Hence, these two luminous functions are suitable for the present invention. However, any other pair of suitable functions (which are not activated at the same time) would also be applicable to it.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

IN THESE FIGURES, THE FOLLOWING REFERENCE NUMBERS HAVE BEEN USED

Figure 1:
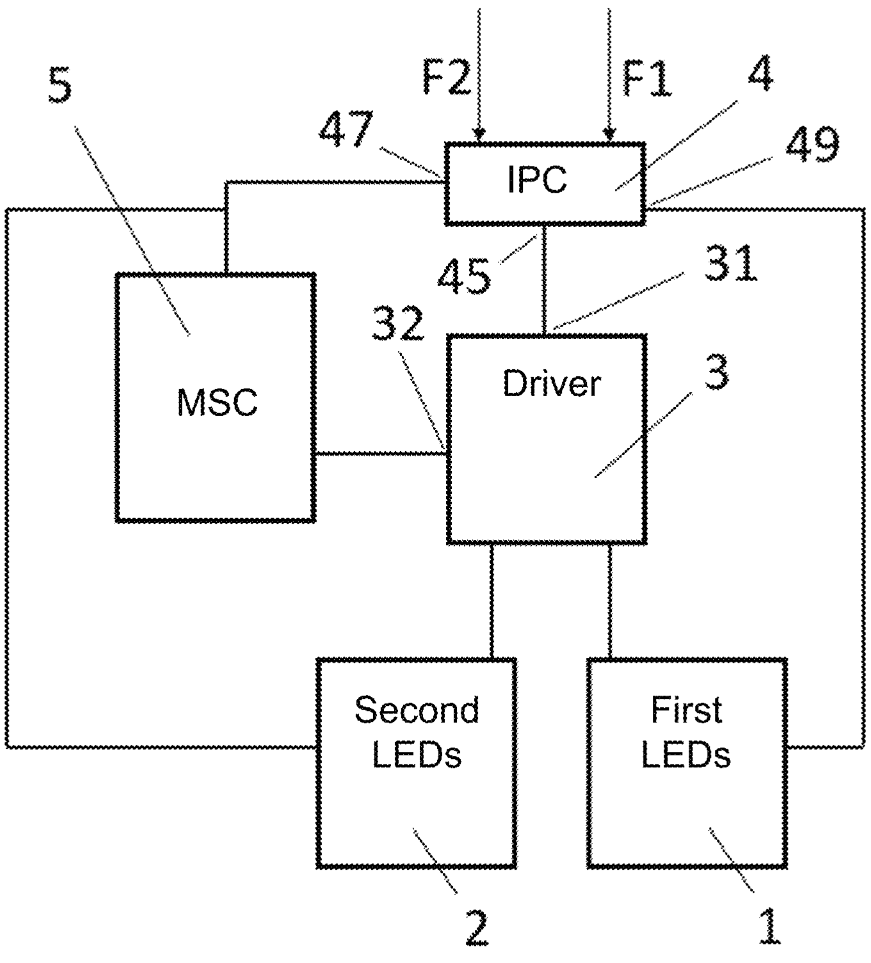
FIG. 1 shows a scheme of an electronic assembly according to the invention.

1 First group of LEDs
10 Rearlamp
11 First LED
12 Switch of the first group of LEDs
2 Second group of LEDs
21 Second LED
22 Switch in the second group of LEDs
3 Driver element
31 First input of the driver element
32 Second input of the driver element
4 Input protection circuit
41 First circuit element
42 Second circuit element
43 First diode
44 Second diode
45 First output of the input protection circuit
46 Third diode
47 Second output of the input protection circuit
48 Third circuit element
49 Third output of the input protection circuit
5 Mode selection circuit
51 First resistor group
52 Second resistor group
53 Switch element in the mode selection circuit
F1 First power signal
F2 Second power signal
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a scheme of an electronic assembly according to the invention.

In this figure, a driver element 3 is configured to control the operation of a first group of LEDs 1 and a second group of LEDs 2. The first group of LEDs 1 is intended to perform a reversing lamp function, while the second group of LEDs 2 is intended to perform a rear fog lamp function.

The driver element 3 receives two inputs: a first input 31 coming from an input protection circuit 4 and a second input 32 coming from a mode selection circuit 5.

The input protection circuit 4 receives two power signals from the body control module of the vehicle: a first control signal F1 which is activated when the body control module of the vehicle requests the activation of the first group of LEDs 1 and a second power signal F2 which is activated when the body control module of the vehicle requests the activation of the second group of LEDs 2. The input protection circuit 4 provides both the power supply to the driver and the required control signal to the mode selection circuit 5 when any of these two light functionalities are requested by the body control module. The power supply is provided by the first protection output 45 and the control to the mode selection circuit is provided by the second protection output 47.

The mode selection circuit 5, depending on the value of the received control signal from the second protection output 47, called mode selection control signal, sends an output value to the driver element 3. The driver element 3, using this control signal received from the mode selection circuit 5, produces in turn a current value. This current value which is output by the driver element 3 depends on the second input of the driver element 3, provided by the mode selection circuit 5. The output current value of the driver element 3 is fed to both the first group of LEDs and to the second group of LEDs. However, since each group of LEDs has its own control, to activate or deactivate it, only the active group of LEDs will effectively receive the output signal of the driver element 3.

Figure 2:
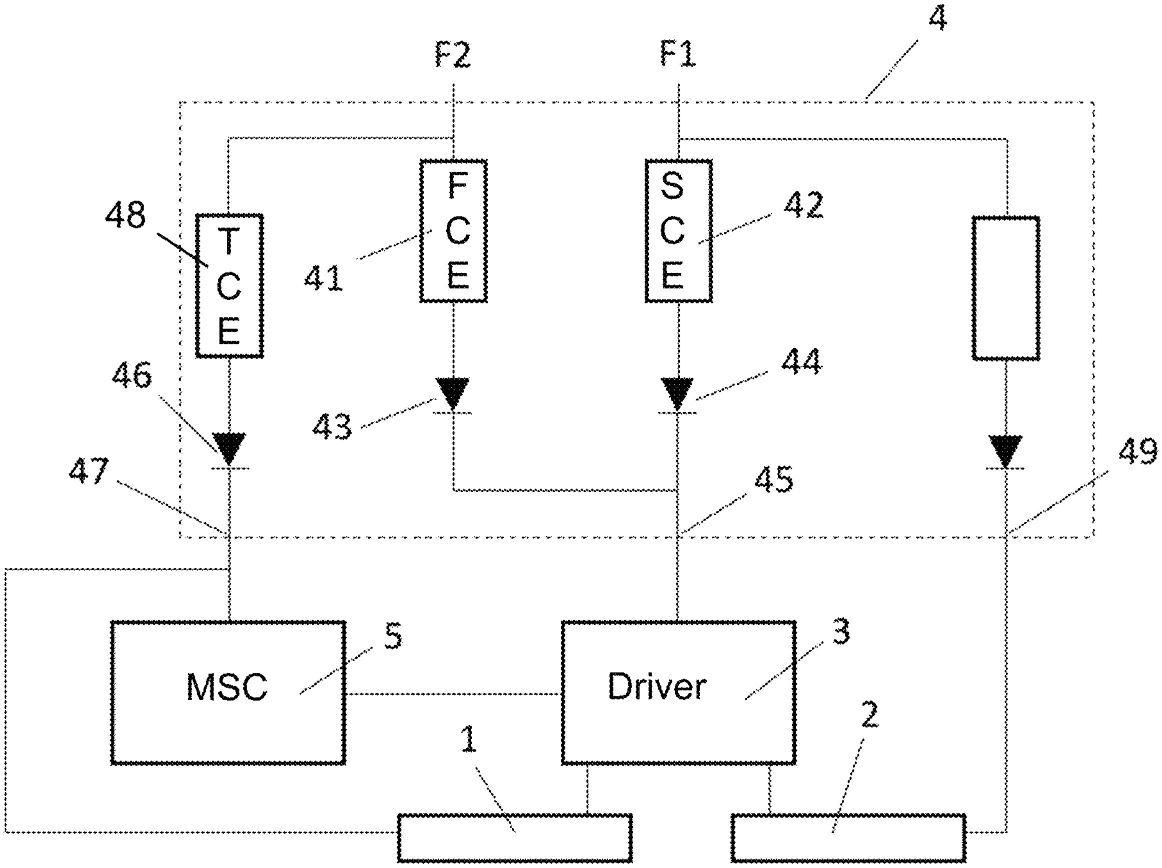
FIG. 2 presents a particular embodiment of some elements of this electronic arrangement.

FIG. 2 shows a scheme of an input protection circuit installed in a particular embodiment of the invention.

The input protection circuit 4 comprises a first circuit element 41 receiving the first power signal F1 and a second circuit element 42 receiving the second power signal F2. Each of the output of the first circuit element and the output of the second circuit element comprises a diode 43, 44, which is electrically connected to the first output 45 of the input protection circuit. This arrangement is equivalent to the use of an OR logical door. When any of these two power signals is received, the input protection circuit allows the power supply to go to the driver.

Further, there is a third circuit element 48. This third circuit element 48 receives the second power signal and produces the mode selection control signal in the second output 47 of the input protection circuit 4. The third circuit element is used from one of the power signals to provide the mode selection control signal to the mode selection circuit. Since the mode selection control signal has a much lower consumption than the driver-light source group, the signal derived to the third circuit is much lower than the power signal output by the first protection output.

In this case, the mode selection circuit 5 receives the mode selection control signal, which comes from the second output 47 of the input protection circuit by the interposition of a control diode 46. This mode selection control signal is only produced when the input protection circuit 4 receives the second power signal F2. Hence, if the requested function is the first function, the mode selection circuit 5 will not receive the mode selection control signal and will provide a first default output signal. If the requested function is the second function, the mode selection circuit will receive the mode selection control signal and will provide a second output signal, different from the first default output signal.

As a consequence, when the first function is requested, the driver will receive a power supply from the first power signal F1 in the first input and a default output signal in the second input. If it is the second function which is requested, the driver will receive a power supply from the second power signal F2 in the first input and a modified output signal in the second input.

With these two inputs (the power signal and the control signal), the driver is configured to provide the corresponding output, which is adapted for the lighting function which has been requested This output is carried to the two groups of light sources. However, as shown before, each group has a switch, so that if a function has been requested, the light group corresponding to the other light function is disabled. Hence, although the driver output is sent to both groups of light sources, only the requested one receives the power supply to emit light.

The result of this electronic arrangement is that, with a single driver element 3, the operation of two different light functionalities, the first group 1 and the second group 2, are controlled.

Figure 3:
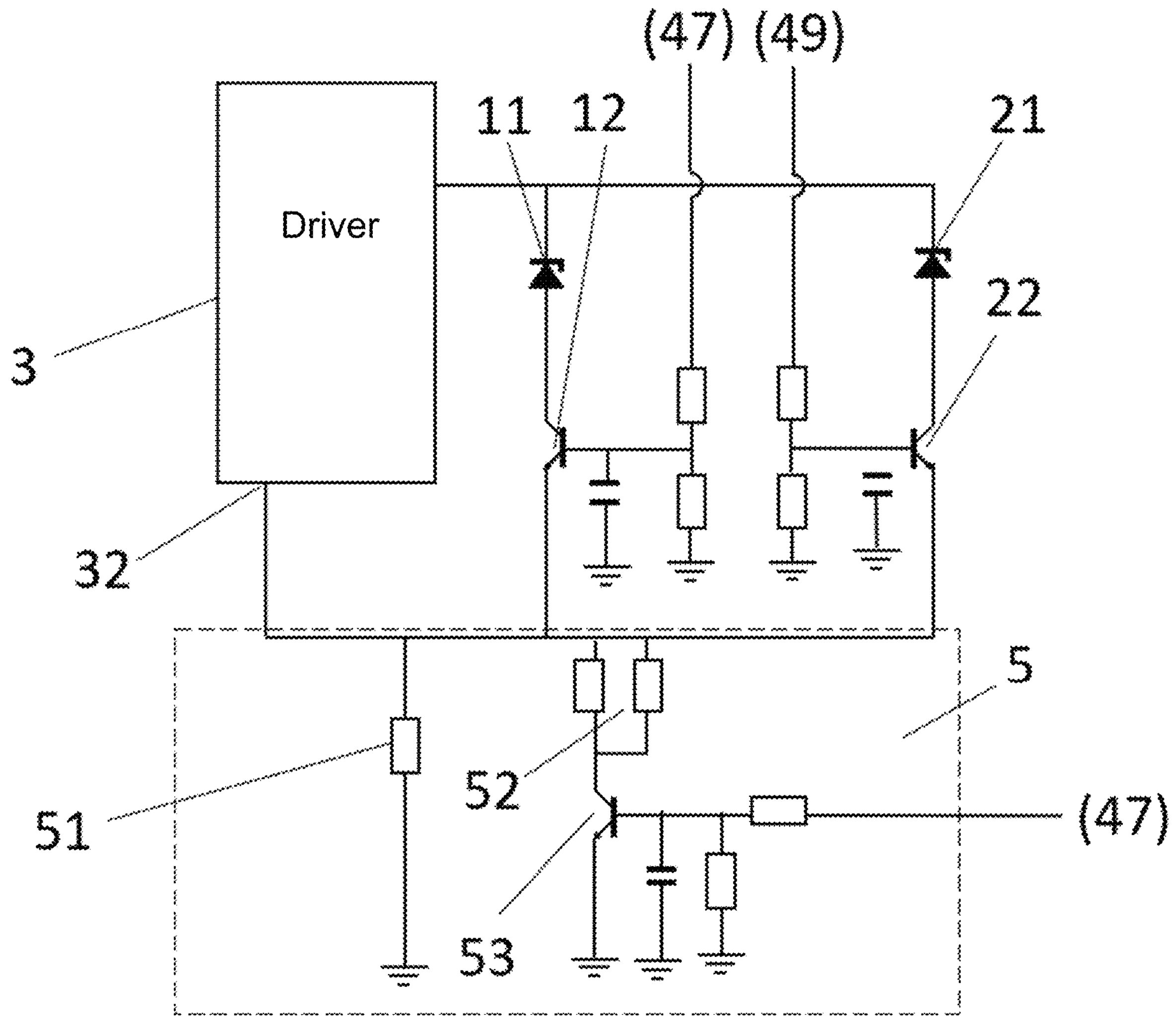
FIG. 3 presents a particular embodiment of some elements of this electronic arrangement.

FIG. 3 presents a particular embodiment of this electronic arrangement.

Firstly, the mode selection circuit 5 comprises a first resistor group 51, a second resistor group 52 and a switch element 53. The mode selection control signal received at the input of the mode selection circuit 5 from the second output of the input protection circuit by the intermediation of the control diode is arranged to act on this switch element 53. If no signal is received in the input of the mode selection circuit, which comes from the second output 47 of the input protection circuit, the output of this mode selection circuit 5 provides a first default value to the driver element 3, defined by the first resistor group 51. However, when this mode selection control signal is received from the output 47, the switch element closes the electric supply to the second resistor group 52, thus modifying the output signal value. The impedance of the mode selection circuit when the second control signal is activated causes the second input of the driver element to receive a higher current value. Due to the driver element features, this makes the output of the driver element to have a current value which is higher than the current value when the second control signal is not activated. The particular embodiment shown in this figure only receives one control signal, coming from the second output 47 of the input protection circuit. The received signal is called mode selection signal. It is enough to receive only one of them, because, since there is no possibility to receive both power signals at the same time, there are only two possible "active" cases: activate the first luminous function or activate the second luminous function. Hence, only two impedance configurations are needed: impedance configuration for the first luminous function (which in this case is achieved when the second control signal, which acts as the mode selection control signal, is not received) and impedance configuration for the second luminous function (which is achieved when the mode selection control signal is received). This effect may also be achieved by an arrangement with the two signals and two switches, but it would involve more elements.

The first light group 1 has a plurality of LEDs 11 and a switch 12. This switch 12 is connected to the input of the second control signal which comes from the second output 47 of the input protection circuit, so that when the second control signal is received, the switch 12 opens the circuit and the current from the driver is not received by the first LEDs 11.

The second light group 2 has a plurality of LEDs 21 and a switch 22. This switch 22 is connected to the input of the first control signal which comes from the third output 49 of the input protection circuit, so that when the first control signal is received, the switch 22 opens the circuit and the current from the driver is not received by the second LEDs 21.

In this figure, the first group of LEDs 1 and the second group of LEDs 2 are arranged in parallel, although they can be arranged in series in different embodiments according to the invention.

Figure 4:
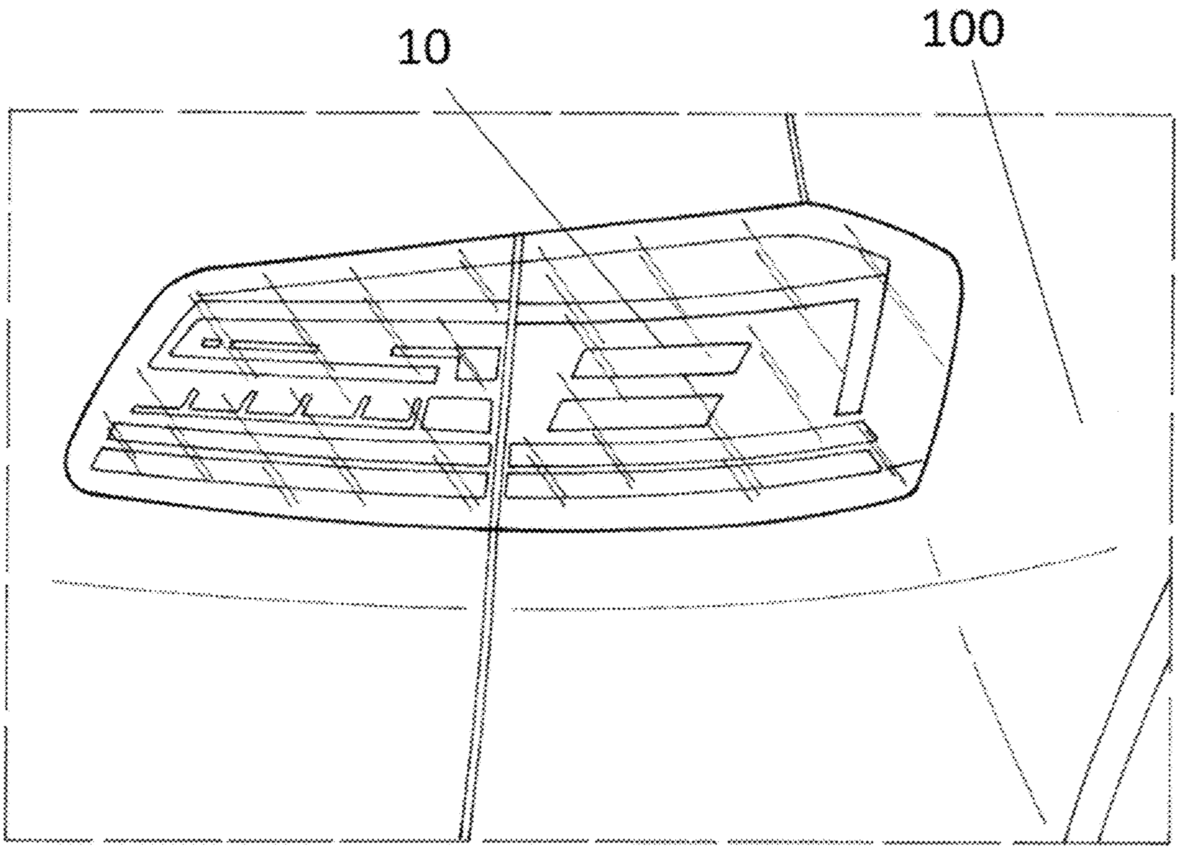
FIG. 4 shows an automotive luminous device comprising an electronic assembly according to the previous figures.

FIG. 4 shows a rear automotive luminous device 10 comprising an electronic assembly according to the previous figures and an optical element arranged to project the light emitted by the light sources. This is a rear lamp 10 and is installed in an automotive vehicle 100. As seen in previous figures, the first luminous function is the rear fog lamp and the second luminous function is the reversing lamp.

What is claimed is:

1. An electronic assembly for an automotive luminous device, comprising:

a first group of light sources, intended to contribute to a first luminous function;

a second group of light sources, intended to perform a second luminous function;

a driver element configured to control an operation of the first group of light sources and of the second group of light sources; and a mode selection circuit, configured to receive a mode selection control signal and to provide an output signal with a control value which depends on the mode selection control signal, wherein the mode selection control signal includes at least one of a first control signal and a second control signal;

wherein the driver element includes:

a first input configured to receive power;

a second input configured to receive the output signal of the mode selection circuit; and an output which is received by the first group of light sources and by the second group of light sources, so that the operation of the first group of light sources and of the second group of light sources is controlled by the output of the driver element;

wherein the first group of light sources includes a first switch controlled by the first control signal and the second group of light sources comprises a second switch controlled by the second control signal, an input protection circuit which is configured to receive a first power signal and a second power signal;

the input protection circuit includes a first protection output connected to the first input of the driver element, so that the input protection circuit controls the power received by the first input of the driver element as a function of the first power signal and the second power signal; and the input protection circuit includes a second protection output which receives one of the first and second power signals and provides the mode selection control signal.

2. The electronic assembly according to claim 1, wherein the input protection circuit includes a first circuit element receiving the first power signal and a second circuit element receiving the second power signal, wherein an output of the first circuit element and an output of the second circuit element are electrically connected to the first protection output of the input protection circuit.

3. The electronic assembly according to claim 2, wherein the input protection circuit includes:

a first diode arranged at the output of the first circuit element, the first diode being directly connected to the first protection output;

a second diode arranged at the output of the second circuit element, the second diode being directly connected to the first protection output; and a third circuit element arranged between one of the first and second power signals and the second protection output, the third circuit element including a third diode.

4. The electronic assembly according to claim 1, wherein the mode selection circuit includes a first resistor group, a second resistor group and at least one switch element, in such a way that the mode selection control signal is arranged to act on the switch element opening or closing electric supply to the second resistor group, thus modifying the output signal value.

5. The electronic assembly according to claim 4, wherein at least one of the first and the second resistor groups includes a BIN resistor and a thermal resistor.

6. The electronic assembly according to claim 4, wherein the mode selection control signal only includes the second control signal and the mode selection circuit only includes one switch element, and an impedance of the mode selection circuit remains the same whether the first control signal is activated or is not activated.

7. The electronic assembly according to claim 6, wherein when the second control signal is activated, the impedance of the mode selection circuit causes the output of the driver element to have a current value which is higher than the current value when the second control signal is not activated.

8. The electronic assembly according to claim 7, wherein the driver is configured to provide a higher current value in the output when the current value received in the second input is higher.

9. The electronic assembly according to claim 4, wherein the switch element is a bipolar junction transistor (BJT) or a metal-oxide-semiconductor field-effect-transistor (MOSFET).

10. The electronic assembly according to claim 1, wherein first group of light sources and second group of light sources are arranged in parallel.

11. The electronic assembly according to claim 1, wherein first group of light sources and second group of light sources are arranged in series.

12. The electronic assembly according to claim 1, wherein the light sources are solid-state light sources.

13. An automotive luminous device comprising:

an electronic assembly including:

a first group of light sources, intended to contribute to a first luminous function;

a second group of light sources, intended to perform a second luminous function;

a driver element configured to control an operation of the first group of light sources and of the second group of light sources; and a mode selection circuit, configured to receive a mode selection control signal and to provide an output signal with a control value which depends on the mode selection control signal, wherein the mode selection control signal includes at least one of a first control signal and a second control signal;

wherein the driver element includes:

a first input configured to receive power;

a second input configured to receive the output signal of the mode selection circuit; and an output which is received by the first group of light sources and by the second group of light sources, so that the operation of the first group of light sources and of the second group of light sources is controlled by the output of the driver element;

wherein the first group of light sources includes a first switch controlled by the first control signal and the second group of light sources comprises a second switch controlled by the second control signal, wherein the first luminous function is the rear fog lamp and the second luminous function is the reversing lamp; and an optical element arranged to project the light emitted by the first group and the second group of light sources, an input protection circuit which is configured to receive a first power signal and a second power signal;

the input protection circuit includes a first protection output connected to the first input of the driver element, so that the input protection circuit controls the power received by the first input of the driver element as a function of the first power signal and the second power signal; and the input protection circuit includes a second protection output which receives one of the first and second power signals and provides the mode selection control signal.

* * * * *